US012645130B2

(12) United States Patent
Yoshiike et al.

(10) Patent No.: US 12,645,130 B2
(45) Date of Patent: Jun. 2, 2026

(54) SECOND HARMONIC GENERATION ELEMENT AND LIGHT SOURCE DEVICE

(71) Applicants: STANLEY ELECTRIC CO., LTD., Tokyo (JP); OSAKA UNIVERSITY, Suita (JP)

(72) Inventors: Masahiro Yoshiike, Meguro-ku (JP); Kazuki Sato, Meguro-ku (JP); Hiroyuki Togawa, Meguro-ku (JP); Ryuji Katayama, Suita (JP); Tomoyuki Tanikawa, Suita (JP); Masahiro Uemukai, Suita (JP); Yusuke Mori, Suita (JP); Masashi Yoshimura, Suita (JP); Tomoaki Nambu, Suita (JP)

(73) Assignees: STANLEY ELECTRIC CO., LTD., Tokyo (JP); OSAKA UNIVERSITY, Osaka (JP)

( * ) Notice: Subject to any disclaimer, the term of this patent is extended or adjusted under 35 U.S.C. 154(b) by 301 days.

(21) Appl. No.: 18/585,164

(22) Filed: Feb. 23, 2024

(65) Prior Publication Data

US 2024/0288748 A1      Aug. 29, 2024

(30) Foreign Application Priority Data

Feb. 24, 2023    (JP) ................................. 2023-027730

(51) Int. Cl.
G02F 1/37          (2006.01)
G02F 1/35          (2006.01)
G02F 1/355         (2006.01)

(52) U.S. Cl.
CPC .............. G02F 1/37 (2013.01); G02F 1/3503 (2021.01); G02F 1/3551 (2013.01)

(58) Field of Classification Search
CPC ................................................ G02F 1/35–397
See application file for complete search history.

(56) References Cited

U.S. PATENT DOCUMENTS 5,038,352 A * 8/1991 Lenth ...................... H01S 5/141
                                                   372/20
12,366,788 B2 * 7/2025 Antognini ............... H01S 3/109
                              (Continued)

FOREIGN PATENT DOCUMENTS

JP           2022514745 A      2/2022

OTHER PUBLICATIONS

Valentin Petrov, Frank Noack, Dezhong Shen, Feng Pan, Guangqiu Shen, Xiaoqing Wang, Ryuichi Komatsu, and Volker Alex, "Application of the nonlinear crystal SrB4O7 for ultrafast diagnostics converting to wavelengths as short as 125 nm," Opt. Lett. 29, 373-375 (2004). (Year: 2004).*

*Primary Examiner* — Rhonda S Peace
(74) *Attorney, Agent, or Firm* — Holtz, Holtz & Volek PC

(57)          ABSTRACT
A second harmonic generation element includes a substrate, a first multilayer film reflecting mirror, a second harmonic generation layer, and a second multilayer film reflecting mirror. The first multilayer film reflecting mirror is formed on the substrate. The second harmonic generation layer is disposed on the first multilayer film reflecting mirror. The second harmonic generation layer is made of a $SrB_4O_7$ crystal that receives a fundamental wave with a predetermined wavelength and emits a second harmonic wave with a wavelength in an ultraviolet region. The second multilayer film reflecting mirror is formed on the second harmonic generation layer. The second multilayer film reflecting mirror constitutes a resonator with the first multilayer film reflecting mirror.

8 Claims, 7 Drawing Sheets

(56)  References Cited

U.S. PATENT DOCUMENTS

2006/0221434  A1*  10/2006  Eno ....................... H01S 3/0627
                                                                        359/328
2022/0066283  A1   3/2022  Gapontsev et al.
2022/0066284  A1*  3/2022  Perlov ..................... C30B 29/22
2024/0288748  A1*  8/2024  Yoshiike ................... G02F 1/37

* cited by examiner

SECOND HARMONIC GENERATION ELEMENT AND LIGHT SOURCE DEVICE

BACKGROUND OF THE INVENTION

1. Technical Field

The present invention relates to a second harmonic generation element and a light source device that uses it.

2. Description of the Related Art

A Second Harmonic Generation (SHG) device that obtains a second harmonic wave using a nonlinear optical phenomenon has been disclosed. For example, JP-T-2022-514745 discloses a laser system having a laser source that emits a fundamental wave of 1064 nm and a higher harmonic generation device that obtains a second harmonic wave with a wavelength of 532 nm and a fourth harmonic wave with a wavelength of 266 nm from the fundamental wave using a Quasi Phase Matching (QPM) method.

For example, when the higher harmonic generation device disclosed in JP-T-2022-514745 is used as a light source for sterilization that emits ultraviolet light with a wavelength of 240 nm or less, which has little effect on a human body, since the shorter the wavelength of the emitted light, the thinner a nonlinear optical crystal that constitutes the device is required, there is a problem that the manufacturing of the device becomes difficult. There is another problem that the higher the harmonic wave order is, the lower the conversion efficiency of the fundamental wave to the harmonic wave becomes, resulting in a decrease in intensity of the obtained light.

The present invention has been made in consideration of the above-described problems, and it is an object of the present invention to provide a second harmonic generation element and a light source device that have high conversion efficiency of the fundamental wave into the ultraviolet light and are easy to manufacture.

A second harmonic generation element according to the present invention includes a substrate, a first multilayer film reflecting mirror, a second harmonic generation layer, and a second multilayer film reflecting mirror. The first multilayer film reflecting mirror is formed on the substrate. The second harmonic generation layer is disposed on the first multilayer film reflecting mirror. The second harmonic generation layer is made of a $SrB_4O_7$ crystal that receives a fundamental wave with a predetermined wavelength and emits a second harmonic wave with a wavelength in an ultraviolet region. The second multilayer film reflecting mirror is formed on the second harmonic generation layer. The second multilayer film reflecting mirror constitutes a resonator with the first multilayer film reflecting mirror.

DETAILED DESCRIPTION

Figure 1:
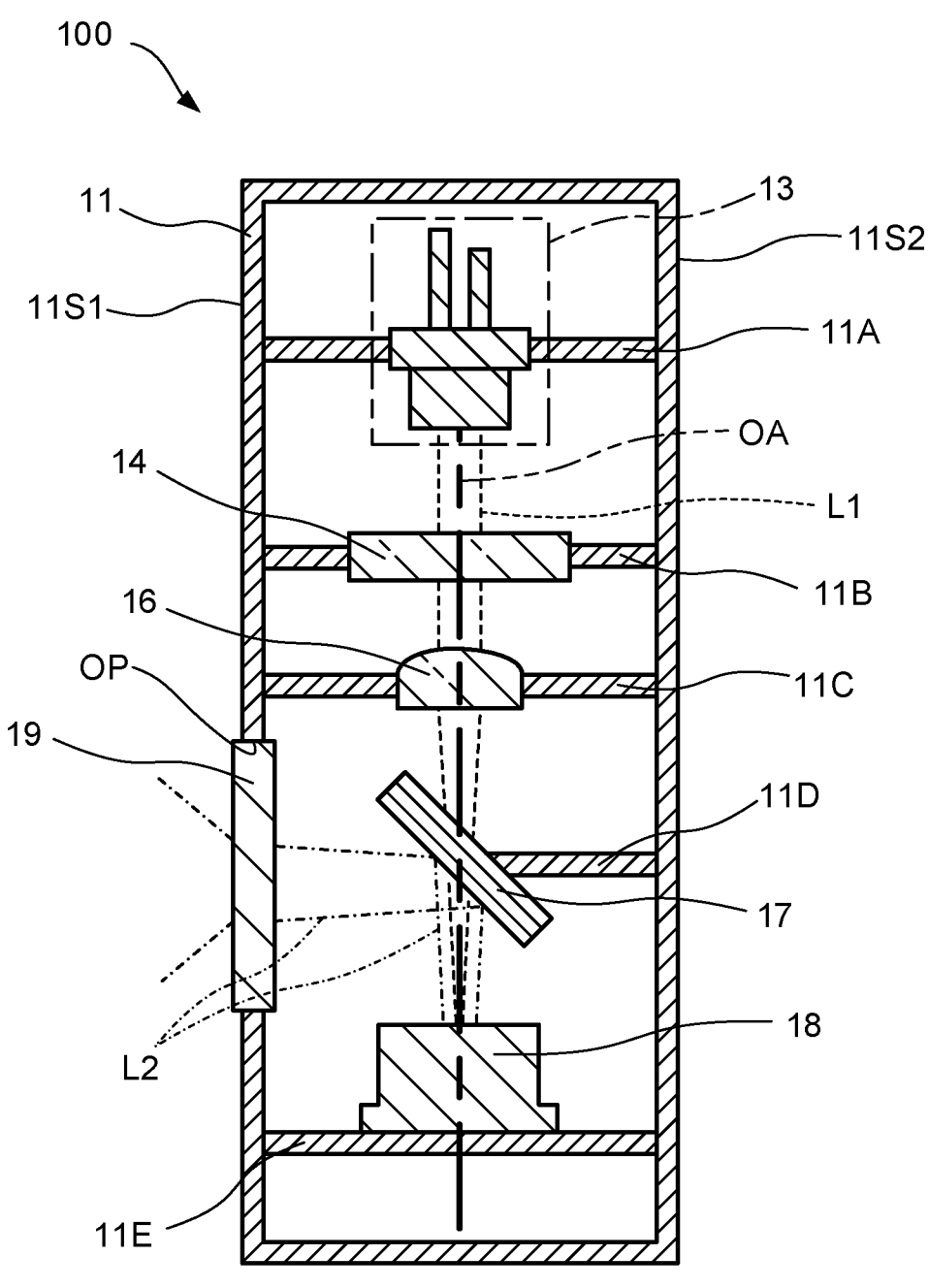
FIG. 1 is a cross-sectional view schematically illustrating a configuration of a light source device according to Embodiment 1.

The following specifically describes embodiments of the present invention with reference to the accompanied drawings. Identical reference numerals are given to identical components in the drawings, and descriptions for the overlapping components will be omitted.

Embodiment 1

Light Source Device According to Embodiment 1

FIG. 1 is a cross-sectional view schematically illustrating a configuration of a light source device 100 according to Embodiment 1. A casing 11 is a rectangular parallelepiped-shaped casing and has an opening portion OP on one surface 11S1. Between the surface 11S1 and a surface 11S2 opposed to the surface 11S1, the casing 11 has supporting structures 11A to 11E, each of which supports a light source and optical members inside the light source device 100, each of which protrudes inward. An up-down direction in FIG. 1 is a height direction of the light source device 100.

A light source 13 is a laser light source that is supported by the supporting structure 11A and has a light-emitting layer made of a III-V group nitride semiconductor. The light source 13 emits blue light having a peak wavelength of 440 nm as a fundamental wave downward in the drawing. A collimator lens (not illustrated) that converts the emission light into parallel light is disposed on a light emission surface of the light source 13. Accordingly, a light beam L1, which is an excitation beam that has become parallel light, is emitted from the light source 13.

An optical lens 14 is a lens supported by the supporting structure 11B so as to be located on an optical axis OA of the light beam L1. The optical lens 14 functions as a beam shaping element that shapes a spot shape of the light beam L1 emitted from the light source 13 into a circular shape. The optical lens 14 is, for example, an aspherical lens.

A condenser lens 16 is a lens supported by the supporting structure 11C so as to be located on the optical axis OA of the light beam L1. The condenser lens 16 receives the light beam L1 emitted from the light source 13 and condenses it downward in the drawing. The condenser lens 16 is, for example, an aspherical condenser lens.

A mirror 17 is a mirror having translucency that is located on the optical axis OA of the light beam L1 and is supported by the supporting structure 11D such that its main surface is inclined with respect to the optical axis OA. The mirror 17 is constituted to transmit light in a blue wavelength region and reflect light in an ultraviolet region. Namely, the light beam L1 emitted from the light source 13 and condensed by the condenser lens 16 is transmitted through the mirror 17. The mirror 17 is, for example, a dichroic mirror.

A second harmonic generation element 18 (hereinafter also referred to as an SHG element 18) is an optical element attached to and supported by the supporting structure 11E so as to be located on the optical axis OA of the light beam L1. The SHG element 18 has a wavelength conversion function of receiving light having a predetermined wavelength as the fundamental wave and emitting light having a wavelength of ½ of the fundamental wave as the second harmonic wave by a nonlinear optical phenomenon.

Specifically, the SHG element 18 has a second harmonic generation layer that receives the light beam L1 with a wavelength of 440 nm emitted from the light source 13 and emits a light beam L2 with a wavelength of 220 nm in a deep ultraviolet region. In this embodiment, the SHG element 18 emits the light beam L2 generated in the second harmonic generation layer toward the mirror 17.

A diffusion plate 19 is a transparent plate-shaped body disposed inside the opening portion OP of the casing 11 such that the light reflected by the mirror 17 is incident on it. The diffusion plate 19 has a function of diffusing the light incident on the diffusion plate 19 at a predetermined spread angle. The diffusion plate 19 is, for example, a lens diffusion plate having minute unevenness on its light receiving surface.

As described above, the mirror 17 reflects the light in the ultraviolet region. Accordingly, the light beam L2 emitted from the SHG element 18 and incident on the mirror 17 is reflected by the mirror 17 and travels toward the diffusion plate 19 disposed inside the opening portion OP. The light beam L2 incident on the diffusion plate 19 is diffused by the diffusion plate 19 at a predetermined spread angle and taken out to outside of the casing 11.

Instead of the diffusion plate 19, in the opening portion OP of the casing 11, a light transmitting plate that causes the light beam L2 reflected by the mirror 17 to be directly transmitted may be disposed, or an aspect of disposing a condenser lens that condense the light beam L2 and emits it to outside may be employed.

The light source device 100 is used as a light source for sterilization, for example, a surface sterilization device that sterilizes a surface of an object, a space sterilization device that sterilizes a space, a medical sterilization device that sterilizes medical apparatuses, and the like, by utilizing the light in the deep ultraviolet region emitted from the diffusion plate 19.

Figure 2:
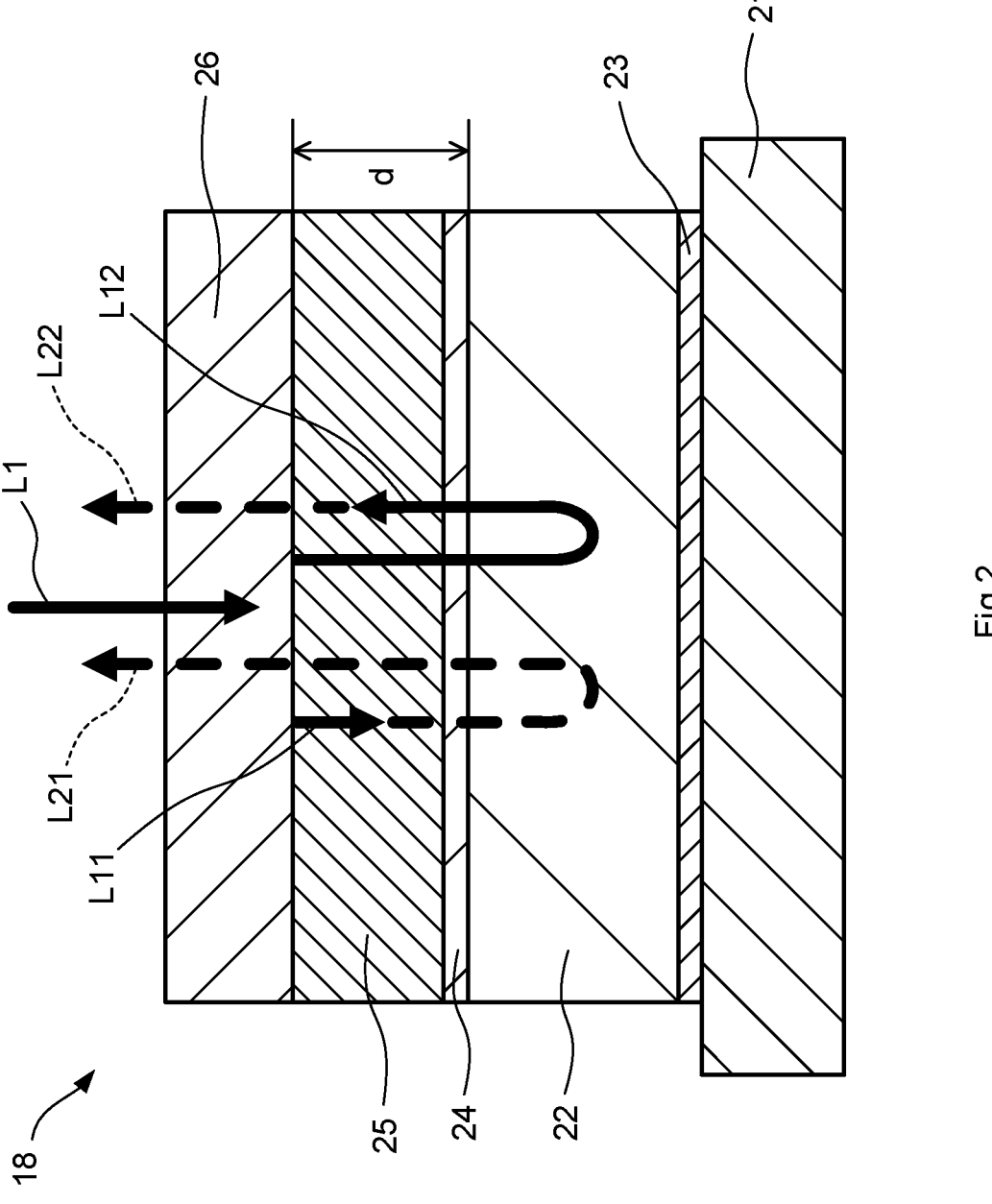
FIG. 2 is a cross-sectional view of a second harmonic generation element in the light source device according to Embodiment 1.

In the light source device 100, the supporting aspect of the light source 13 and the other optical members by the supporting structures 11A to 11E is not limited to this, and an aspect of supporting by other methods such as laminating with an adhesive material or mechanical securing with screws or the like may be employed. [Second Harmonic Generation Element of Embodiment 1] The following describes the SHG element 18 disposed in the light source device 100 by using FIG. 2. FIG. 2 is a cross-sectional view illustrating a configuration of the SHG element 18 illustrated in FIG. 1. In the drawing, the up-down direction is a height direction of the SHG element 18.

A support substrate 21 is a flat plate-shaped substrate in which an upper surface has a rectangular shape. The support substrate 21 is made of, for example, sapphire (Al$_2$O$_3$), aluminum nitride (AlN), silicon (Si), or the like.

A first multilayer film reflecting mirror 22 is a multilayer film reflecting mirror in which an upper surface has a rectangular shape and that is disposed on the upper surface of the support substrate 21 via an adhesive layer 23 made of epoxy resin. The first multilayer film reflecting mirror 22 is a so-called Distributed Bragg Reflector (DBR) in which high refractive index films having a high refractive index and low refractive index films having a relatively lower refractive index than the high refractive index film are alternately laminated.

The first multilayer film reflecting mirror 22 is formed by alternately laminating 19 pairs of high refractive index films made of hafnium oxide (HfO$_2$) and low reflective index films made of silicon dioxide (SiO$_2$) on the upper surface of the support substrate 21. For example, the thickness of the high refractive index film is 38 nm, and the thickness of the low refractive index film is 99 nm, which constitute the first multilayer film reflecting mirror 22.

A thin film layer 24 is a thin film that is formed over the upper surface of the first multilayer film reflecting mirror 22 and is constituted by laminating one pair of the high refractive index film made of HfO$_2$ and the low reflective index film made of SiO$_2$.

Each of the high refractive index film and the low reflective index film constituting the thin film layer 24 is formed thicker than each of the high refractive index film and the low reflective index film constituting the first multilayer film reflecting mirror 22. In other words, the thin film layer 24 differs from one of the thin film pairs constituting the first multilayer film reflecting mirror 22 only in thickness. For example, the thickness of the high refractive index film is 49 nm, and the thickness of the low refractive index film is 121 nm, which constitute the thin film layer 24.

A second harmonic generation layer 25 (hereinafter also referred to as an SHG layer 25) is a plate-shaped body in which an upper surface has a rectangular shape and that is disposed on the thin film layer 24. The SHG layer 25 is made of strontium borate (SrB$_4$O$_7$: SBO) crystal that is a nonlinear optical crystal generating a nonlinear optical phenomenon.

For example, the thickness of the SHG layer 25 is approximately 1.55 μm and is a coherence length L$_c$ from which largest wavelength conversion efficiency can be obtained without periodic polarization or a polarity inversion structure. The thickness of the SHG layer 25 can also be made to be an odd natural number multiple of the coherence length L$_c$. Here, the coherence length L$_c$ is expressed by Formula 1 described below, where λ$_ω$ is the wavelength of the fundamental wave, n$_ω$ is the refractive index of the SHG layer 25 relative to the fundamental wave, and n$_{2ω}$ is the refractive index of the SHG layer 25 relative to the second harmonic wave.

$$L_c = \frac{\lambda_\omega}{4(n_{2\omega} - n_\omega)} \qquad \text{[Formula 1]}$$

The SBO crystal constituting the SHG layer 25 has an orthorhombic single crystal structure that has crystal axes constituted of three axes of an a-axis, a b-axis, and a c-axis, which are orthogonal to one another, and the lengths of which are different from one another. In the SBO crystal, a b-plane, which is a crystal plane along which the b-axis perpendicularly passes, corresponds to the upper surface and a lower surface of the SHG layer 25.

A second multilayer film reflecting mirror 26 is a multilayer film reflecting mirror that is formed over the upper surface of the SHG layer 25. Similarly to the first multilayer film reflecting mirror 22, the second multilayer film reflecting mirror 26 is the so-called Distributed Bragg Reflector (DBR) in which the high refractive index films and the low refractive index films are alternately laminated.

The second multilayer film reflecting mirror 26 is formed by laminating 11 pairs of the high refractive index films made of HfO$_2$ and the low refractive index films made of SiO$_2$ on the upper surface of the SHG layer 25. For example, the thickness of the high refractive index film is 51 nm, and the thickness of the low refractive index film is 89 nm, which constitute the second multilayer film reflecting mirror 26.

The first multilayer film reflecting mirror 22 and the second multilayer film reflecting mirror 26 are disposed so as to sandwich the SHG layer 25 in the up-down direction in the drawing, and confine the light beam L1 emitted from the light source 13 between the first multilayer film reflecting mirror 22 and the second multilayer film reflecting mirror 26 and cause it to resonate.

The first multilayer film reflecting mirror 22 and the second multilayer film reflecting mirror 26 are configured to reflect the light beam L1, which is the light beam with a blue wavelength, between the first multilayer film reflecting mirror 22 and the second multilayer film reflecting mirror 26. The transmittance of the first multilayer film reflecting mirror 22 and the transmittance of the second multilayer film reflecting mirror 26 for the light beam L1 are each 1% or less.

It is preferable that a total thickness d of the SHG layer 25 and the thin film layer 24 satisfies Formula 2 described below, where n is the refractive index obtained by adding the thickness of each layer to each refractive index of the SHG layer 25 and the thin film layer 24, a phase change amount of the fundamental wave due to reflection at the first multilayer film reflecting mirror 22 is Φ1, a phase change amount of the fundamental wave due to reflection at the second multilayer film reflecting mirror 26 is 2, and an integer is $m$. However, in practice, a value may deviate from Formula 2 to some extent. In this case, it is preferable that the setting be made to make reinforcement between the generated second harmonic waves largest.

$$\Phi1 + \Phi2 + 2\frac{2\pi nd}{\lambda_\omega} = 2m\pi \qquad \text{[Formula 2]}$$

When a round trip length of a resonator is an integral multiple of the wavelength of the fundamental wave, the light beam L1 traveling to the SHG element 18 is transmitted through the second multilayer film reflecting mirror 26 and enters the SHG layer 25, and its intensity is increased by resonance between the first multilayer film reflecting mirror 22 and the second multilayer film reflecting mirror 26.

In a process of being repeatedly reflected between the first multilayer film reflecting mirror 22 and the second multilayer film reflecting mirror 26, the light beam L1 that has entered the SHG layer 25 can generate the light beam L2 as the second harmonic wave every time it passes through the SHG layer 25.

In the SHG element 18, the first multilayer film reflecting mirror 22 is configured to reflect the light beam L2, which is the light in the ultraviolet wavelength region, and the transmittance of the first multilayer film reflecting mirror 22 for the light beam L2 is 1% or less. On the other hand, the second multilayer film reflecting mirror 26 is configured to transmit the light beam L2 and has high transmittance for the light beam L2 traveling to the second multilayer film reflecting mirror 26.

Since the transmittances of the first multilayer film reflecting mirror 22 and the second multilayer film reflecting mirror 26 for the light beam L1 and the light beam L2 are configured as described above, the light beam L2 generated in the SHG layer 25 is not transmitted through the first multilayer film reflecting mirror 22, but is transmitted only through the second multilayer film reflecting mirror 26. In other words, in the embodiment, an upper surface of the second multilayer film reflecting mirror 26 is an incident surface for the light beam L1 and is an emission surface for the light beam L2.

As illustrated in FIG. 2, the light beam L2 generated in the SHG layer 25 is divided into a light beam L21 generated by a light beam L11 of the light beam L1 that travels from the top to the bottom in the drawing and a light beam L22 generated by a light beam L12 of the light beam L1 that is reflected by the first multilayer film reflecting mirror 22 and travels from the bottom to the top in the drawing. Of these, the light beam L21 is reflected by the first multilayer film reflecting mirror 22 and is transmitted through the second multilayer film reflecting mirror 26, and the light beam L22 is directly transmitted through the second multilayer film reflecting mirror 26.

In general terms, conversion efficiency $\eta_{SHG}$ into the second harmonic wave when the fundamental wave is transmitted through the SHG layer once is expressed by Formula 3 described below, where an angular frequency of the fundamental wave is ω, the refractive index of the SHG layer for the fundamental wave is no, the refractive index of the SHG layer for the second harmonic wave is n$_{2\omega}$, the thickness of the SHG layer is l, an effective nonlinear optical constant is d$_{eff}$, the intensity of the fundamental wave is P$_\omega$, a beam cross-sectional area is A, a wavenumber mismatch amount between the fundamental and the second harmonic waves is Δk. ε$_0$ is dielectric constant in vacuum, and c is the velocity of light.

$$\eta_{SHG} = \frac{2}{\varepsilon_0 c^3} \frac{\omega^2 d_{eff}^2 l^2}{(n_\omega)^2 n_{2\omega}} \left(\frac{\sin(\Delta kl/2)}{\Delta kl/2}\right)^2 \frac{P_\omega}{A} \qquad \text{[Formula 3]}$$

A second harmonic wave complex amplitude B$_{in}$ generated inside the SHG layer 25 is expressed by Formula 4 described below using a forward movement fundamental wave complex amplitude A$_f$ and a backward movement fundamental wave complex amplitude A$_b$, which are present inside the SHG layer 25. Namely, the wavelength conversion efficiency during resonance will be described below.

$$B_{in} = \kappa\left\{r_b^{2\omega} \frac{2|A_f|^2 L}{\pi}\exp\{j(2\phi_f^\omega - \beta^{2\omega}L)\}\exp(-j\beta^{2\omega}L) + \frac{2|A_b|^2 L}{\pi}\exp\{j(2\phi_b^\omega - \beta^{2\omega}L)\}\right\} \qquad \text{[Formula 4]}$$

In Formula 4, ω is the angular frequency of the fundamental wave, ε$_0$ is the dielectric constant in vacuum, E$^\omega$ is a complex electric field amplitude of the fundamental wave, E$^{2\omega}$ is a complex electric field amplitude of the second harmonic wave, d$_{eff}$ is the effective nonlinear optical constant, r$_b^{2\omega}$ is a complex reflection coefficient of the first multilayer film reflecting mirror 22 for the second harmonic wave, $L$ is the thickness of the SHG layer 25, $\Phi_f^\omega$ is a fundamental wave phase at an upper end of the SHG layer 25, $\Phi_b^\omega$ is a fundamental wave phase at a lower end of the SHG layer 25, and β$^{2\omega}$ is a propagation constant of the second harmonic wave inside the SHG layer 25. k is a coefficient and is expressed by Formula 5 described below.

$$\kappa = \frac{2\omega\varepsilon_0}{4} \int\int [E^{2\omega}(x, y)]^* d_{eff} [E^{\omega}(x, y)]^2 dxdy \quad \text{[Formula 5]}$$

Here, when powers of the forward movement fundamental wave, the backward movement fundamental wave and the second harmonic wave inside the SHG layer 25 are each $P_t^{\omega}$, $P_b^{\omega}$, and $P_{in}^{2\omega}$, then $A_f$, $A_b$, and $B_{in}$ in Formula 4 become Formulae 6, 7, and 8 described below, respectively.

$$A_f = \sqrt{P_f^{\omega}} \quad \text{[Formula 6]}$$

$$A_b = \sqrt{P_b^{\omega}} \quad \text{[Formula 7]}$$

$$B_{in} = \sqrt{P_{in}^{2\omega}} \quad \text{[Formula 8]}$$

A second harmonic wave complex amplitude $B_{out}$ taken out to outside of the device is expressed by Formula 9 described below using the second harmonic wave complex amplitude $B_{in}$. However, when the power of the second harmonic wave is $P_{OUT}^{2\omega}$ taken out to outside of the device, Formula 10 described below is obtained.

$$B_{out} = \frac{t_t^{2\omega}}{1 - r_t^{2\omega}r_b^{2\omega}\exp(-j2\beta^{2\omega}L)}B_{in} \quad \text{[Formula 9]}$$

$$B_{out} = \sqrt{P_{out}^{2\omega}} \quad \text{[Formula 10]}$$

Here, $r_t^{2\omega}$ is a complex reflection coefficient of the second multilayer film reflecting mirror 26 for the second harmonic wave, and $t_t^{2\omega}$ is a complex transmission coefficient of the second multilayer film reflecting mirror 26 for the second harmonic wave. At this time, the device structure is defined as a structure that makes $|B_{OUT}|^2/P^{\omega}$ to be largest with respect to an incident fundamental wave power $P^{\omega}$. Namely, the SBO crystal is selected as a material with a large effective nonlinear optical constant $d_{eff}$, and as a result, the power of the second harmonic wave can be increased.

In Formula 3 described above, a part "(sin (Δkl/2)/Δkl/2)²" represents a phase matching state between the fundamental wave and the second harmonic wave, and when phase matching is completely achieved, Δk=0, and the value becomes 1. In Formula 3, a part "$P_{\omega}/A$" represents a power density of the light beam L1.

As described above, the SHG layer 25 is made of the SBO crystal, and the surface of the SHG layer 25 on which the light beam L1 emitted from the light source 13 is incident, namely, the upper surface of the SHG layer 25 that is contact with the lower surface of the second multilayer film reflecting mirror 26, is the b-plane which is the crystal plane through which the b-axis of the SBO crystal perpendicularly passes.

By entering the light beam L1 from the b-plane, the nonlinear optical constant $d_{eff}$ of the SBO crystal in the SHG layer 25 becomes a value larger than that of other nonlinear optical crystals when the fundamental wave is converted into the second harmonic wave. This allows improving the

8 conversion efficiency $\eta_{SHG}$ of the fundamental wave into the second harmonic wave in Formula 3 described above.

In the embodiment, by making a polarization of the light source 13 parallel to the c-axis of the SHG layer, the value of the nonlinear optical constant $d_{eff}$ in the SBO crystal becomes 3.5 pm/V. For example, the nonlinear optical constant $d_{eff}$ of β barium borate (βBaB$_2$O$_4$: BBO) crystal as another nonlinear optical crystal is 1.85 pm/V.

In the SBO crystal, a shortest wavelength of the second harmonic wave that can be generated, namely, a shortest SHG wavelength is shorter than that of other nonlinear optical crystals. This allows the SHG layer 25 to emit light with a smaller wavelength in the ultraviolet region compared to other nonlinear optical crystals. For example, the shortest SHG wavelength of the SBO crystal is 130 nm, and the shortest SHG wavelength of the BBO crystal as another nonlinear optical crystal is 205 nm.

The above-described BBO crystal has a property of easily absorbing the light with a wavelength in the deep ultraviolet region, specifically, the light with a wavelength of 220 nm. Thus, when the BBO crystal is used for the SHG layer 25 of the embodiment, the intensity of the light obtained from the light source device 100 may be decreased.

On the other hand, the SBO crystal used for the SHG layer 25 in the embodiment is less likely to absorb the light with a wavelength of 220 nm. Accordingly, by using the SBO crystal for the SHG layer 25, it is possible to emit the light with a wavelength of 220 nm with higher intensity than when the BBO crystal is used.

In the embodiment, the SHG element 18 can cause the fundamental wave to be incident on the SHG layer 25 in a state of increasing the power density of the excitation beam (the light beam L1) inside the thin film layer 24 and the SHG layer 25, namely, in a state of increasing the part "Po/A" in Formula 3 described above. Accordingly, in Formula 3 described above, it is possible to improve the conversion efficiency $\eta_{SHG}$ of the fundamental wave into the second harmonic wave.

In the SHG element 18 of the embodiment, while a structure in which the thin film layer 24 is not formed can be adopted, the wavelength conversion efficiency can be increased by forming the thin film layer 24 between the first multilayer film reflecting mirror 22 and the SHG layer 25.

The SHG element 18 having a resonator structure in which the thin film layer 24 and the SHG layer 25 are sandwiched between the first multilayer film reflecting mirror 22 and the second multilayer film reflecting mirror 26 as in this embodiment can be more easily manufactured compared to, for example, an SHG element using a Pseudo Phase Matching (QPM) method.

Specifically, in a case of an SHG element using the QPM method, it is necessary to reduce the thickness of the nonlinear optical crystal that constitutes the SHG element as the wavelength of the second harmonic wave to be emitted becomes shorter, and it is also necessary to laminate a plurality of thinned nonlinear optical crystals such that their phases are alternately inverted. In such a case, it becomes difficult to align the thickness of each nonlinear optical crystal, resulting in making it difficult to easily manufacture the SHG element.

In the embodiment, one SBO crystal is used as the SHG layer 25. Accordingly, since there is no need to individually align the thickness of the nonlinear optical crystal, the SHG element 18 can be easily manufactured by combining the first multilayer film reflecting mirror 22 and the second multilayer film reflecting mirror 26.

Therefore, according to the embodiment, it is possible to obtain a second harmonic generation element that has high conversion efficiency of the fundamental wave into the ultraviolet light and is easy to manufacture.

In the embodiment, while an example in which the light source device 100 is used as a light source for sterilization has been described, the use of the light source device 100 is not limited to this. For example, the light source device 100 may be used as a light source for exposure when manufacturing a printed circuit board or as a light source for processing when processing micro holes in resin or the like.

For example, when the light source device 100 is used as a light source for exposure, vacuum ultraviolet light (VUV) having a wavelength of 200 nm or less is used as the second harmonic wave. In such a case, instead of the high refractive index film made of $HfO_2$ constituting each of the first multilayer film reflecting mirror 22, the thin film layer 24, and the second multilayer film reflecting mirror 26, by using a high refractive index film made of magnesium oxide (MgO), the light source device 100 can be used as a light source device that emits VUV.

[Manufacturing Method of Second Harmonic Generation Element]

The following describes a manufacturing method of the SHG element 18 in the embodiment using FIGS. 2 to 5.

First, an SBO crystal 25B grown as a bulk crystal is prepared using a Top Seeded Solution Growth (TSSG) method, which is one of single crystal growth methods (Process 1: an SBO crystal preparation process).

Next, one surface of the SBO crystal 25B, more specifically, the b-plane of the above-described crystal plane where the nonlinear optical constant $d_{eff}$ becomes 3.5 pm/V in causing the light beam L1 to be incident is mirror-polished using an abrasive material such as diamond slurry (Process 2: an SBO crystal polishing process).

Figure 3:
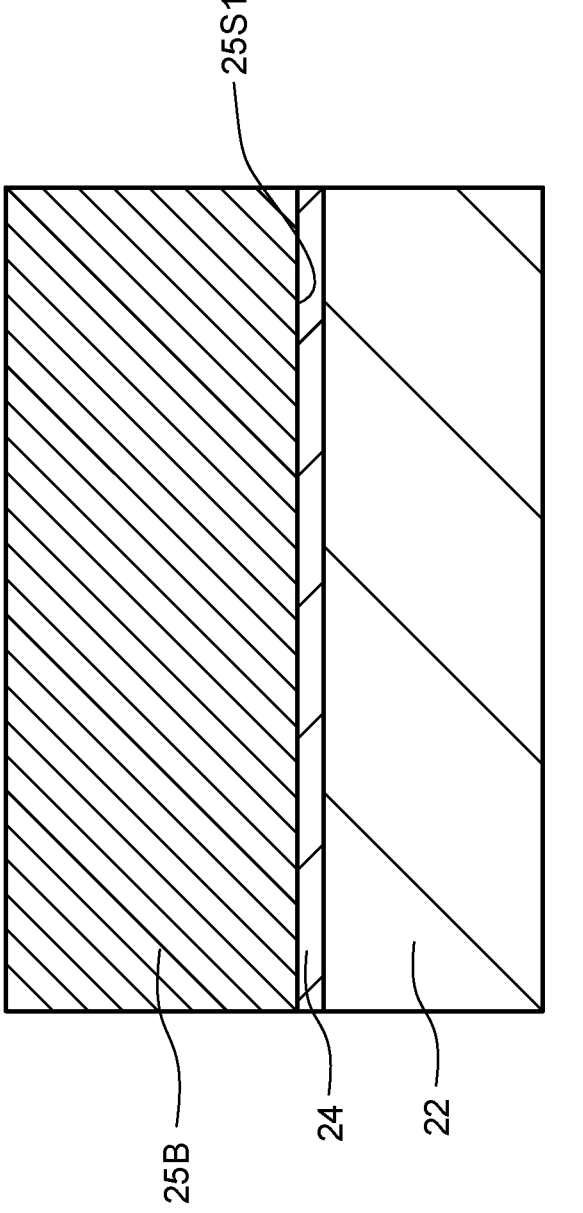
FIG. 3 is a cross-sectional view illustrating a manufacturing process of the second harmonic generation element in the light source device according to Embodiment 1.

Next, as illustrated in FIG. 3, on a surface 25S1 polished in Process 2, the thin film layer 24 made of one pair of $HfO_2$ and $SiO_2$ is formed using a sputtering method, and then the first multilayer film reflecting mirror 22 made of 19 pairs of $HfO_2$ and $SiO_2$ is formed on it (Process 3: a thin film layer and first multilayer film reflecting mirror forming process).

Figure 4:
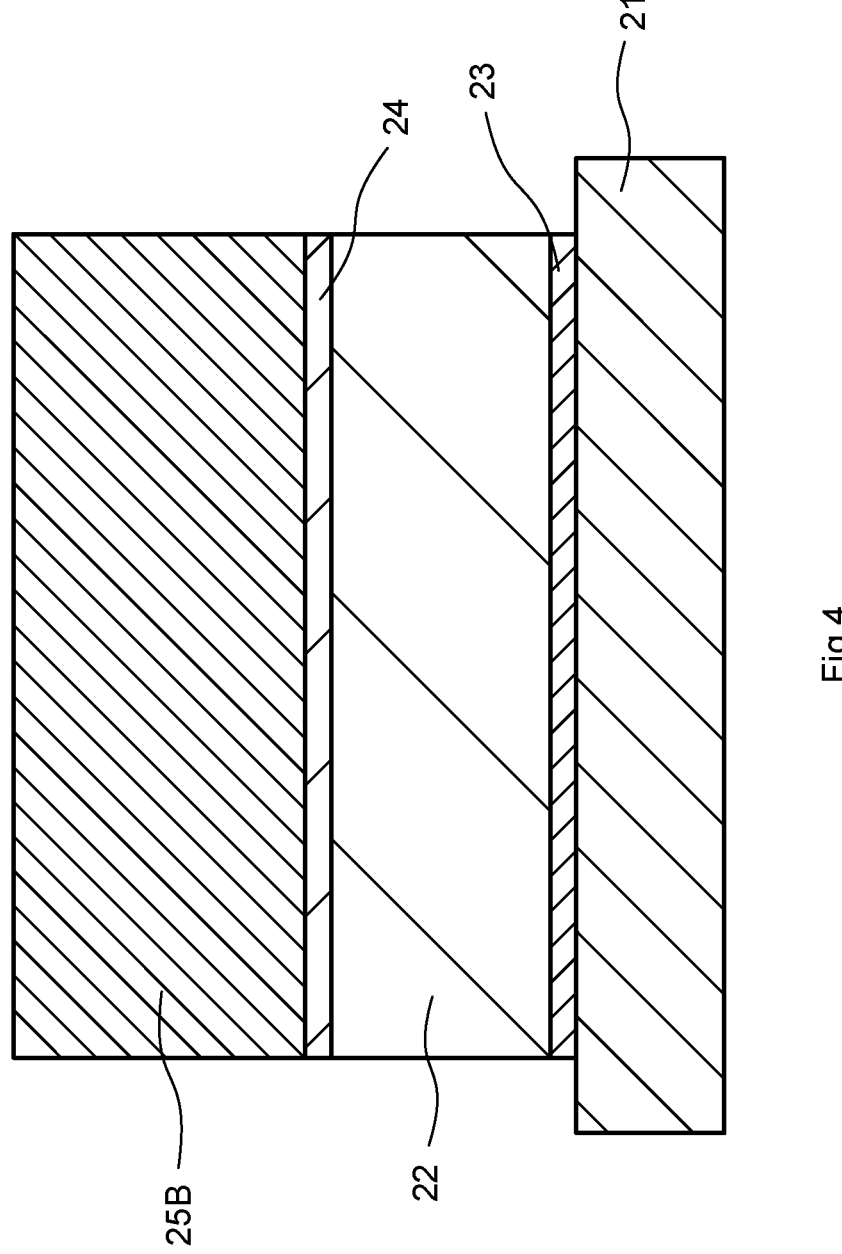
FIG. 4 is a cross-sectional view illustrating the manufacturing process of the second harmonic generation element in the light source device according to Embodiment 1.

Next, as illustrated in FIG. 4, the support substrate 21 is laminated on the surface of the first multilayer film reflecting mirror 22 via the adhesive layer 23 made of epoxy resin (Process 4: a support substrate laminating process).

Figure 5:
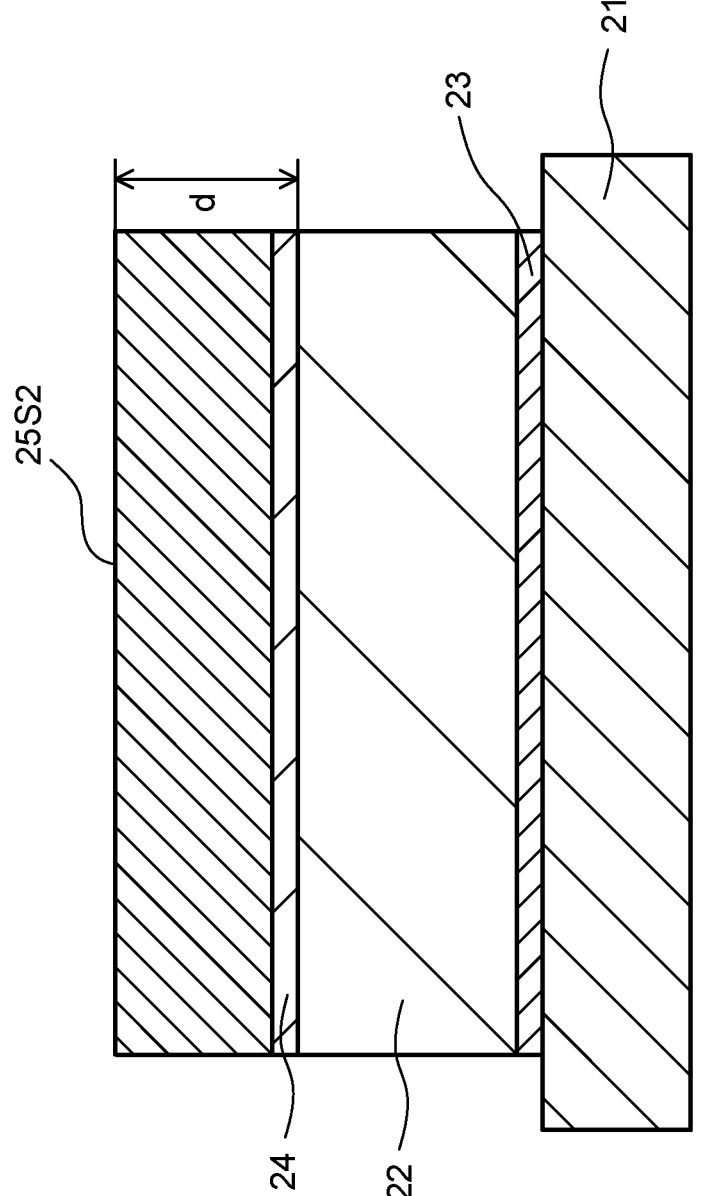
FIG. 5 is a cross-sectional view illustrating the manufacturing process of the second harmonic generation element in the light source device according to Embodiment 1.

Next, as illustrated in FIG. 5, a surface 25S2 opposed to the surface 25S1 of the SBO crystal 25B, more specifically, the b-plane of the above-described crystal plane where the nonlinear optical constant $d_{eff}$ becomes 3.5 pm/V in causing the light beam L1 to be incident is mirror-polished using the abrasive material such as diamond slurry to adjust the thickness (Process 5: an SBO crystal polishing process). At this time, the surface 25S2 of the SBO crystal 25B is polished such that the total thickness d of the thin film layer 24 and the second harmonic generation layer 25 satisfies Formula 2 described above.

Finally, as illustrated in FIG. 2, on the surface 25S2 of the second harmonic generation layer 25 the thickness of which has been adjusted, the second multilayer film reflecting mirror 26 made of 11 pairs of $HfO_2$ and $SiO_2$ is formed by the sputtering method (Process 6: a second multilayer film reflecting mirror forming process). With the above-described processes, the SHG element 18 in the present invention can be manufactured.

Embodiment 2

Light Source Device According to Embodiment 2

Figure 6:
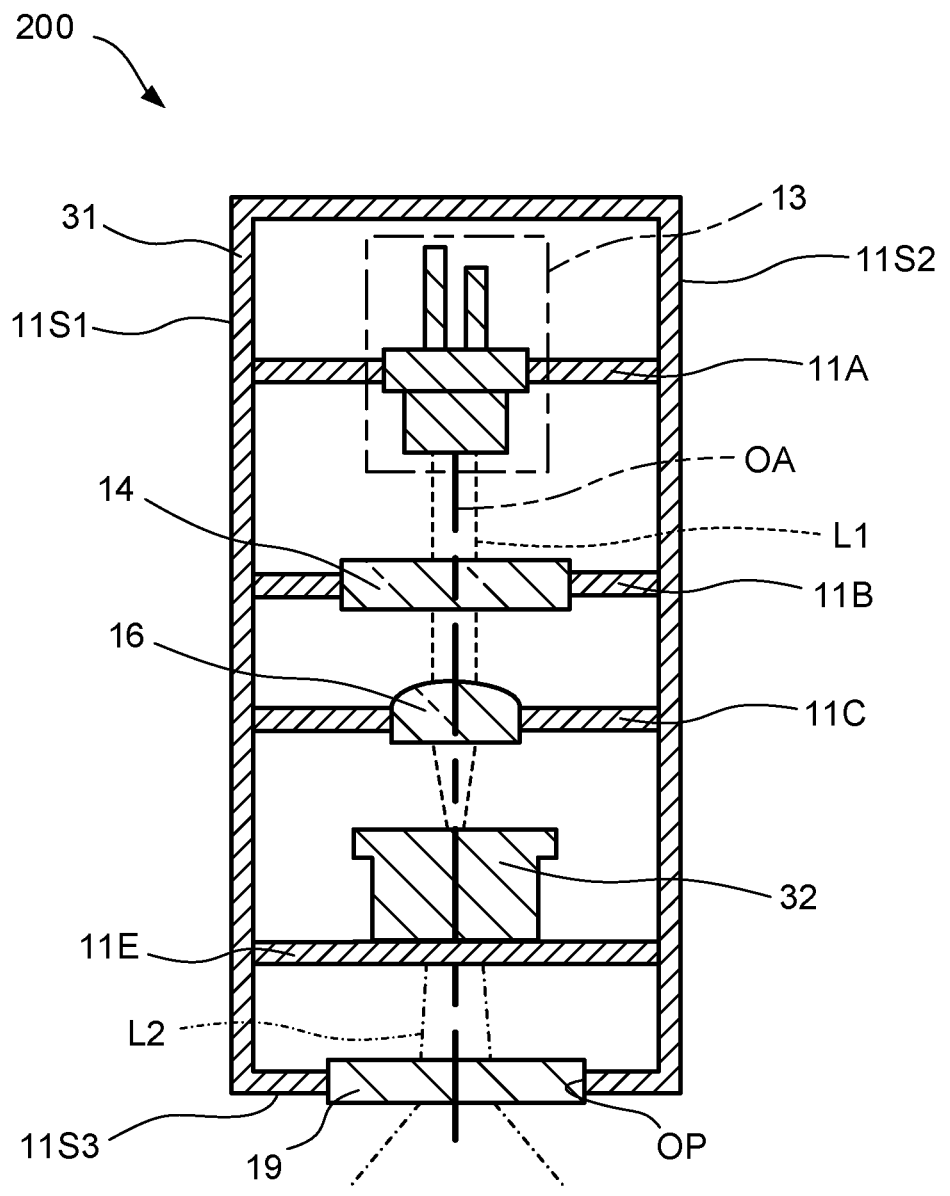
FIG. 6 is a cross-sectional view schematically illustrating a configuration of a light source device according to Embodiment 2.

Next, a description will be given of Embodiment 2 using FIGS. 6 and 7. FIG. 6 is a cross-sectional view schematically illustrating a configuration of a light source device 200 according to Embodiment 2. The light source device 200 is different from the second harmonic generation element 18 of Embodiment 1 in the configuration of a second harmonic generation element 32, and other points, for example, arrangement aspects of the light source 13 and lenses are similar to those in Embodiment 1.

In the embodiment, a casing 31 of the light source device 200 has the opening portion OP that is disposed on the optical axis OA of the light beam L1 in a surface 11S3 orthogonal to the surface 11S1 and the surface 11S2. The diffusion plate 19 is disposed inside the opening portion OP. Namely, in the embodiment, the diffusion plate 19 is disposed on the optical axis OA of the light beam L1.

In the embodiment, the supporting structure 11E has translucency to the light with a wavelength in the ultraviolet region, and the second harmonic generation element 32 (hereinafter also referred to as an SHG element 32) is laminated to the supporting structure 11E. For example, quartz glass is used for the supporting structure 11E.

In the embodiment, the mirror 17 is not disposed in the light source device 200, and the SHG element 32 is configured to receive the light beam L1 emitted from the light source 13 and emit the light beam L2, which is the second harmonic wave, from a surface opposed to a surface on which the light beam L1 is incident. The light beam L2 emitted from the SHG element 32 is incident on the diffusion plate 19 via the supporting structure 11E, is diffused by the diffusion plate 19 at a predetermined spread angle, and is taken out to outside of the casing 31.

Second Harmonic Generation Element of Embodiment 2

Figure 7:
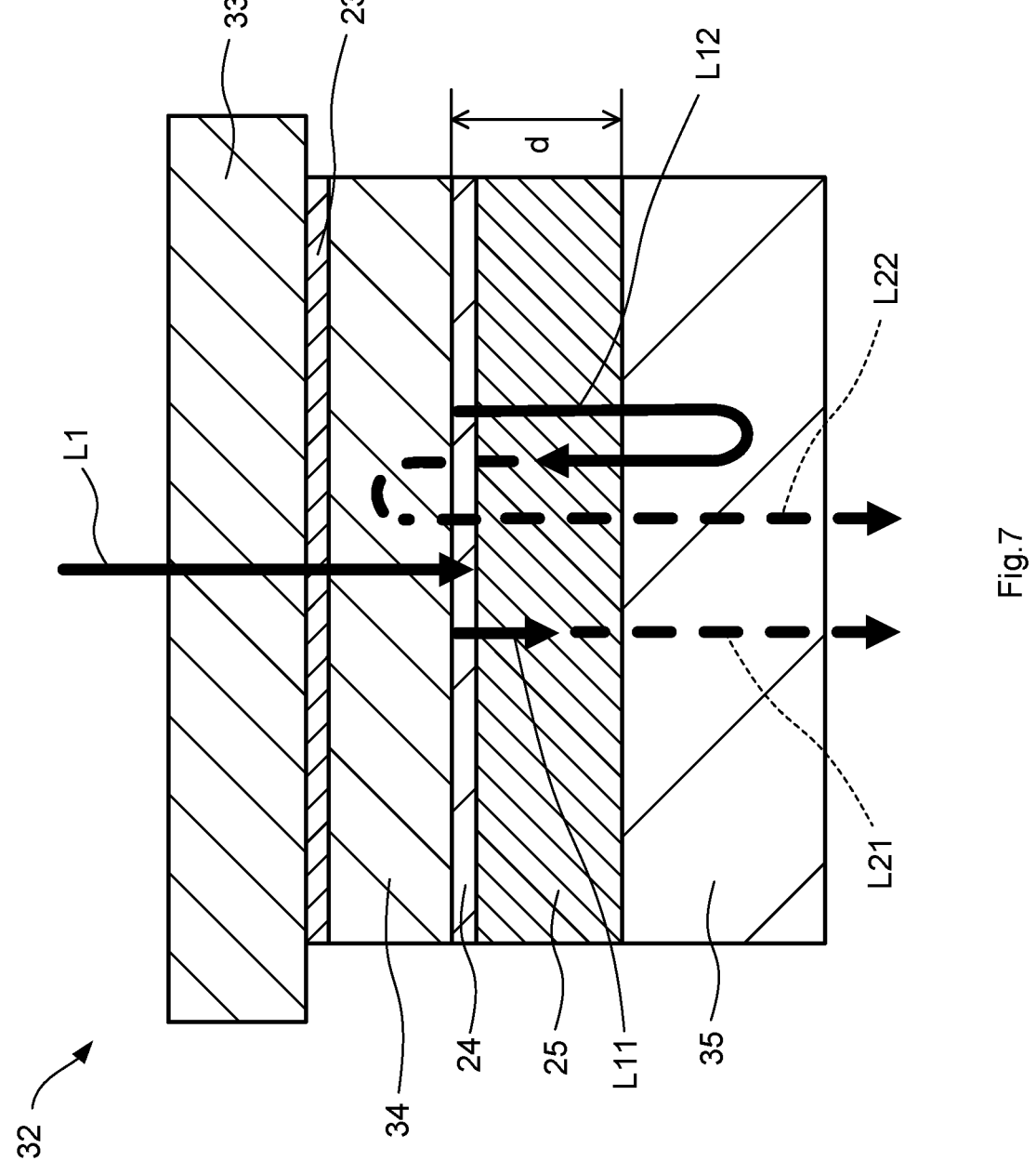
FIG. 7 is a cross-sectional view of a second harmonic generation element in the light source device according to Embodiment 2.

The following describes the SHG element 32 disposed in the light source device 200 using FIG. 7. FIG. 7 is a cross-sectional view of the SHG element 32 that can be incorporated into the light source device 200.

In the embodiment, a support substrate 33 is made of a material such as sapphire that has translucency to blue wavelength light.

The SHG element 32 can be incorporated into the light source device 200 in the aspect illustrated in FIG. 7, specifically in the aspect in which the lower surface of the support substrate in the light source device 100 of Embodiment 1 is directed upward. Namely, in the embodiment, the light beam L1 emitted from the light source 13 is incident on the SHG layer 25 through the support substrate 33.

In the embodiment, a first multilayer film reflecting mirror 34 is constituted of one that reflects the light beam L2, which is the light in the ultraviolet wavelength region, and the transmittance of the first multilayer film reflecting mirror 34 for the light beam L2 is 1% or less. On the other hand, a second multilayer film reflecting mirror 35 is constituted of one that transmits the light beam L2 and has a high transmittance for the light beam L2 traveling to the second multilayer film reflecting mirror 35.

In the embodiment, as illustrated in FIG. 7, the light beam L2 generated in the SHG layer 25 is divided into the light beam L21 that is generated by the light beam L11 traveling from the top to the bottom in the drawing and the light beam L22 that is generated by the light beam L12 reflected by the second multilayer film reflecting mirror 35 and traveling from the bottom to the top in the drawing. Of these, the light beam L21 is directly transmitted through the second multilayer film reflecting mirror 35, and the light beam L22 is reflected by the first multilayer film reflecting mirror 34 and is transmitted through the second multilayer film reflecting mirror 35.

In the embodiment as well, the total thickness d of the thin film layer 24 and the SHG layer 25 has such a thickness that the phase of the light beam L21 and the phase of the light beam L22 reinforce with one another and are emitted from the SHG element 32, as shown in Formula 1 described above.

Therefore, in the embodiment as well, similarly to Embodiment 1, by using the SBO crystal as the SHG layer in the SHG element, the conversion efficiency $\eta_{SHG}$ of the fundamental wave into the second harmonic wave can be improved.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims. The present application is based upon and claims the benefit of priority from the prior Japanese Patent Application No. 2023-027730 filed on Feb. 24, 2023, the entire contents of which are incorporated herein by reference.

What is claimed is:

1. A second harmonic generation element comprising:
a substrate;
a first multilayer film reflecting mirror formed on the substrate;
a second harmonic generation layer disposed on the first multilayer film reflecting mirror, the second harmonic generation layer being made of a $SrB_4O_7$ crystal that receives a fundamental wave with a predetermined wavelength and emits a second harmonic wave with a wavelength in an ultraviolet region; and
a second multilayer film reflecting mirror formed on the second harmonic generation layer, the second multilayer film reflecting mirror constituting a resonator with the first multilayer film reflecting mirror.

2. The second harmonic generation element according to claim 1, wherein
the second harmonic wave has a wavelength of 240 nm or less.

3. The second harmonic generation element according to claim 1, wherein
between the first multilayer film reflecting mirror and the second harmonic generation layer, a thin film layer having a configuration that differs only in thickness from one pair of thin film pairs constituting the first multilayer film reflecting mirror is formed.

4. The second harmonic generation element according to claim 1, wherein
the first multilayer film reflecting mirror and the second multilayer film reflecting mirror are formed by alternately laminating thin films made of $HfO_2$ and thin films made of $SiO_2$.

5. The second harmonic generation element according to claim 1, wherein
the first multilayer film reflecting mirror and the second multilayer film reflecting mirror are formed by alternately laminating thin films made of $MgO$ and thin films made of $SiO_2$.

6. A light source device comprising:
the second harmonic generation element according to claim 1; and
a laser light source made of a III-V group nitride semiconductor that emits the fundamental wave toward an upper surface of the second multilayer film reflecting mirror of the second harmonic generation element or a lower surface of the substrate.

7. The light source device according to claim 6, wherein
the first multilayer film reflecting mirror and the second multilayer film reflecting mirror of the second harmonic generation element are configured such that the second harmonic wave is emitted to outside from the second multilayer film reflecting mirror.

8. The light source device according to claim 6, wherein
the substrate has translucency, and
the first multilayer film reflecting mirror and the second multilayer film reflecting mirror of the second harmonic generation element are configured such that the fundamental wave is incident on the first multilayer film reflecting mirror from the substrate and the second harmonic wave is emitted to outside from the second multilayer film reflecting mirror.

* * * * *